US012792964B2

(12) United States Patent
Valluru et al.

(10) Patent No.: US 12,792,964 B2
(45) Date of Patent: Nov. 10, 2026

(54) SYSTEMS AND METHODS FOR IDENTIFYING MODEL DEGRADATION AND PERFORMING MODEL RETRAINING

(71) Applicant: Verizon Patent and Licensing Inc., Basking Ridge, NJ (US)

(72) Inventors: Srinivasarao Valluru, Hyderabad (IN); Ria V. Sijo, Flower Mound, TX (US); Dhanraj J. Nair, Flower Mound, TX (US); Sarathchandra Konidena, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 656 days.

(21) Appl. No.: 18/348,937

(22) Filed: Jul. 7, 2023

(65) Prior Publication Data

US 2025/0013916 A1 Jan. 9, 2025

(51) Int. Cl.
*G06N 20/00* (2019.01)

(52) U.S. Cl.
CPC .................................... *G06N 20/00* (2019.01)

(58) Field of Classification Search
CPC .......... G06N 20/00; G06N 20/20; G06N 7/01; G06F 18/23; G06F 18/2155
See application file for complete search history.

(56) References Cited

U.S. PATENT DOCUMENTS

| | | | | |
|---|---|---|---|---|
| 11,568,167 | B2 * | 1/2023 | Hines | G06N 3/0464 |
| 11,620,579 | B2 * | 4/2023 | Vasisht | G06N 5/04 706/12 |
| 11,934,960 | B2 * | 3/2024 | Merrill | G06N 3/084 |
| 12,045,733 | B2 * | 7/2024 | Ambati | G06N 5/02 |
| 12,165,017 | B1 * | 12/2024 | Grossman | G06F 17/17 |
| 12,216,740 | B2 * | 2/2025 | Mukherjee | G06F 18/2155 |
| 12,238,122 | B2 * | 2/2025 | Garcia | H04L 63/1425 |
| 12,293,305 | B2 * | 5/2025 | Kallur Palli Kumar | G06N 5/04 |
| 12,361,093 | B2 * | 7/2025 | Ambati | G06N 20/00 |
| 12,400,010 | B2 * | 8/2025 | Carley | H04L 9/0618 |
| 12,406,191 | B2 * | 9/2025 | Perkins | G06N 20/00 |
| 12,468,997 | B2 * | 11/2025 | Wheelwright | G06Q 10/0637 |

* cited by examiner

*Primary Examiner* — Hosuk Song

(57) ABSTRACT

In some implementations, a device may receive first input data, the first input data including first numerical data and first categorical data. The device may train a machine learning model using the first input data. The device may receive second input data, the second input data including second numerical data and second categorical data. The device may evaluate, using a set of components, the machine learning model based on receiving second input data. The device may determine whether a set of results of the evaluating the machine learning model using the set of components satisfies a threshold. The device may retrain the machine learning model, to generate a re-trained machine learning model, using the second input data based on the set of results satisfying the threshold. The device may deploy the re-trained machine learning model.

20 Claims, 9 Drawing Sheets

SYSTEMS AND METHODS FOR IDENTIFYING MODEL DEGRADATION AND PERFORMING MODEL RETRAINING

BACKGROUND

A computing platform may collect large volumes of data regarding usage of the computing platform. For example, a telecommunications service provider may collect large volumes of data regarding networks and devices. In this example, the data can include call logs, location data, internet traffic, service provisioning data, subscription data, or billing data, among other examples. Analyzing the data can provide valuable insights into network performance, customer behavior, and service quality. With the advent of machine learning and artificial intelligence techniques, large volumes of data can be analyzed via machine learning models to derive insights and/or enable control of a computing platform or system, such as a telecommunications system.

DETAILED DESCRIPTION OF EXAMPLE EMBODIMENTS

Figure 1A:
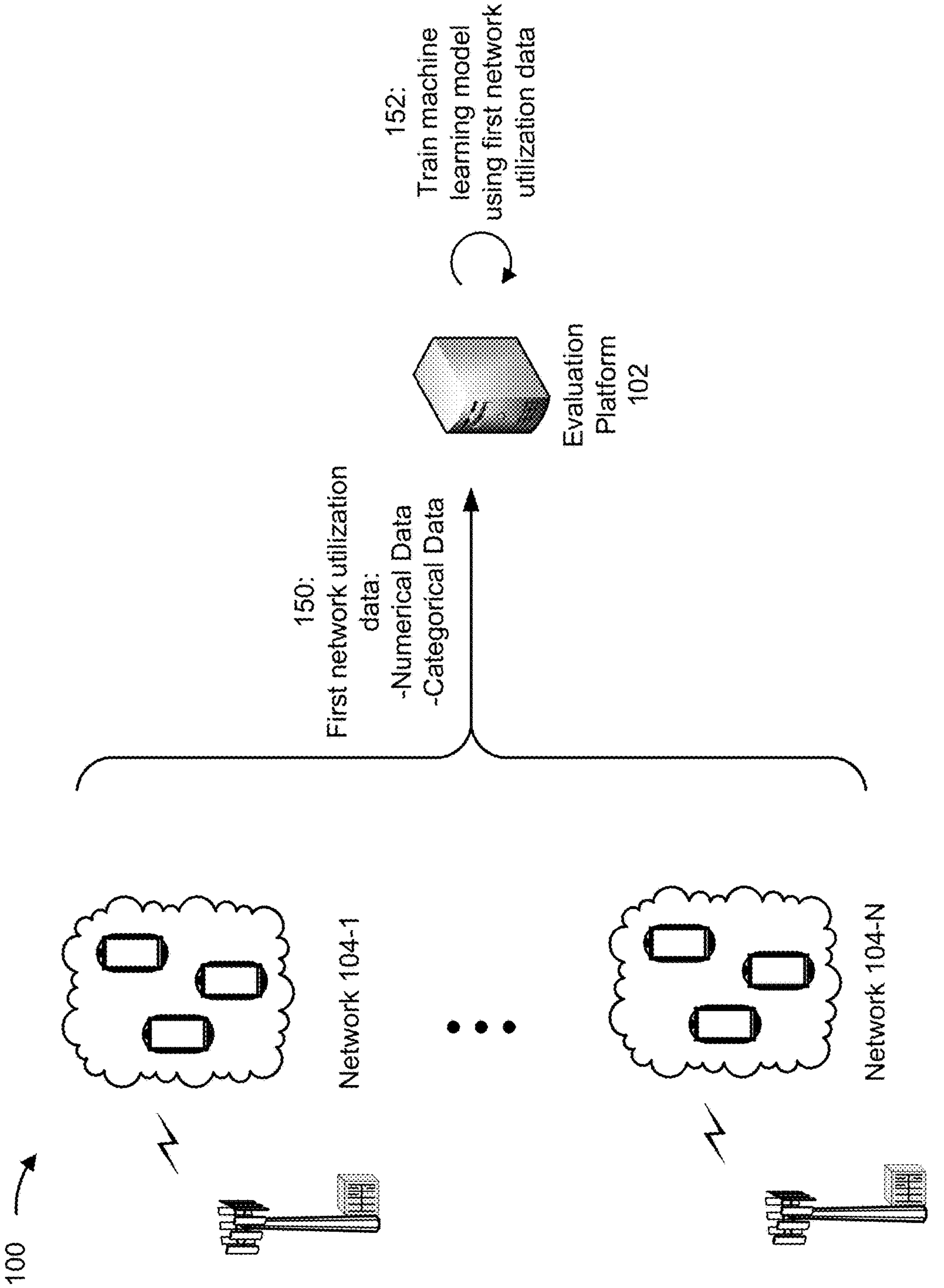
FIGS. 1A-1D are diagrams of an example associated with predictive machine learning model retraining.

The following detailed description of example implementations refers to the accompanying drawings. The same reference numbers in different drawings may identify the same or similar elements.

Machine learning is used to evaluate large data sets in many different industries to discover trends, to classify the data, to make determinations, and/or to make predictions. For example, machine learning models can be used to evaluate telecommunications datasets relating to network conditions, service provisioning, or service usage, among other examples. An entity may train a machine learning model, such as a neural network, a decision tree model, or another type of model, to receive input data from a set of sources and evaluate the input data. For example, a telecommunications provider may train a machine learning model to receive telecommunications datasets and predict whether, for example, a security risk is present or a device is engaging in fraudulent usage of network services. Fraudulent usage of network services may include accessing services that are not allocated or assigned to a user device, accessing services for which payment has not been made, engaging in call spoofing or short message service (SMS) spoofing, unauthorized subscriber identity module (SIM) card cloning, installation of malware or spyware, or spamming, among other examples.

When a machine learning model is trained, the machine learning model may analyze input training data and generate a representation of the underlying structure of the input training data. If the machine learning model is well-trained (e.g., accurate), the underlying structure of the input training data is well represented, and new data can be analyzed using the machine learning model to perform a prediction. In other words, the machine learning model is trained to attempt to model real world connections between data points and potential outcomes that can be predicted. For example, a machine learning model can be trained to predict that a particular pattern of data points is correlated with a likelihood of fraudulent usage of network services.

However, the underlying structure of data being generated by a system can change over time. For example, data usage by users, fraudulent activity, types of user devices deployed in a network, patterns of usage of the devices in the network, types of services available in the network, or other factors may change over time. As a result, a machine learning model trained using an input training data set captured in a first time period may have a high degree of accuracy at performing predictions in a second time period proximate to the first time period, but may degrade and achieve a comparatively lower degree of accuracy at performing predictions in a third, later time period.

With increasing network sizes and amounts of data being generated, however, manual determination of an accuracy of the machine learning model may not be possible. For example, when a machine learning model fails to detect that a user device is committing fraud, there may be no way to detect that the user device was, in fact, committing fraud unless the fraud is subsequently reported to a network service provider or other entity. It is possible to retrain a machine learning model according to a periodic schedule to avoid the machine learning model becoming stale (e.g., inaccurate as a result of being trained based on a first underlying structure of data (which may be related to user or device behaviors) when evaluating data associated with a second underlying structure of data). However, this can result in retraining a machine learning model that remains accurate, which wastes computing resources. Accordingly, it is desirable to predictively retrain a machine learning model before the machine learning model becomes stale, but not predictively retrain a machine learning model that is not presently stale or likely to become stale in the near future.

Some implementations described herein enable predictive machine learning model retraining. In some implementations, an evaluation system may evaluate incoming data, which can be used by a machine learning model to perform a prediction, to determine whether an underlying structure of the data or another characteristic of the data has changed over time. For example, the evaluation system may determine that an underlying structure of data has changed based on receiving data that deviates from a configured range, exhibits a shifted median value, has a different statistical distribution, exhibits different relationships between data fields, exhibits a different variance, or exhibits a different time relationship. Based on the determination that the underlying structure of the data or another characteristic of the data has changed, the evaluation system may determine whether a model has degraded and whether to retrain a machine learning model that performs predictions using the data. In this case, the evaluation system may trigger machine learning model retraining, thereby avoiding inaccurate predictions using a stale model and avoiding unnecessary retraining of the machine learning model when the machine learning model is not stale (or is not imminently becoming stale). In this way, the use of computing resources and network resources is reduced in connection with using machine learning models.

FIGS. 1A-1D are diagrams of an example 100 associated with predictive machine learning model retraining. As shown in FIGS. 1A-1D, example 100 includes an evaluation platform 102 and a set of networks 104 (e.g., which may include core network devices associated with a network service provider and user devices associated with users of the network).

As further shown in FIG. 1A, and by reference number 150, the evaluation platform 102 may receive first network utilization data. For example, the evaluation platform 102 may receive numerical data and/or categorical data regarding one or more networks 104 and/or devices thereof. In some implementations, the evaluation platform 102 may receive data associated with a particular operating environment. For example, the evaluation platform 102 may receive data associated with a telecommunications network, a cloud computing platform, a non-cloud computing system, or another operating environment. In some implementations, the evaluation platform 102 may receive data associated with a particular type of prediction. For example, in a context of network utilization data, the evaluation platform 102 may receive data associated with usage of network services, which may enable a fraud or security risk prediction. Additionally, or alternatively, the evaluation platform 102 may receive data associated with network performance, which may enable a network parameter prediction, such as for optimizing network traffic. In another context, the evaluation platform 102 may receive another type of data, such as data relating to physical resource utilization to generate a prediction relating to optimization of a cloud computing network.

In some implementations, the evaluation platform 102 may receive data associated with a particular format. For example, the evaluation platform 102 may receive numerical data that includes numeric values for a set of parameters or variables. Additionally, or alternatively, the evaluation platform 102 may receive categorical data that includes non-numeric values for a set of parameters or variables. In this case, the evaluation platform 102 may convert the categorical data into numeric data by assigning values to different possible categorical values. Additionally, or alternatively, the evaluation platform 102 may process the categorical data as non-numeric data, such as by applying natural language processing techniques, semantic analysis techniques, clustering techniques, or other techniques that enable utilization of non-numeric data by computing platforms.

As further shown in FIG. 1A, and by reference number 152, the evaluation platform 102 may train a machine learning model using the first network utilization data. For example, the evaluation platform 102 may train a machine learning model, as described in more detail below, to predict whether usage of one or more networks 104 is indicative of a fraudulent use case or a security risk. In some implementations, the evaluation platform 102 may evaluate the machine learning model to determine whether the machine learning model is well-trained. For example, the evaluation platform 102 may divide the first network utilization data into a training set, which is used for training the machine learning model, and a validation set, which is used for validating an accuracy of the machine learning model. In this case, based on the machine learning model achieving a threshold level of accuracy, the evaluation platform 102 may determine that the machine learning model is well-trained and may deploy the machine learning model.

In some implementations, the evaluation platform 102 may determine one or more metrics associated with the first network utilization data in connection with training the machine learning model. For example, the evaluation platform 102 may determine a set of ranges for a set of values, a set of statistical metrics (e.g., means, medians, distributions, variances, or standard deviations) for one or more parameters of the first network utilization data. Additionally, or alternatively, the evaluation platform 102 may determine a set of relationships between parameters of the first network utilization data. For example, the evaluation platform 102 may determine a level of independence (or dependence) of a first parameter relative to a second parameter. In some implementations, the one or more metrics may be based on embeddings of the machine learning model. For example, based on determining one or more features for the machine learning model, the evaluation platform 102 may determine one or more embedding values associated with the one or more features. In this case, the one or more metrics may represent an underlying structure of the first network utilization data, as described in more detail below.

Figure 1B:
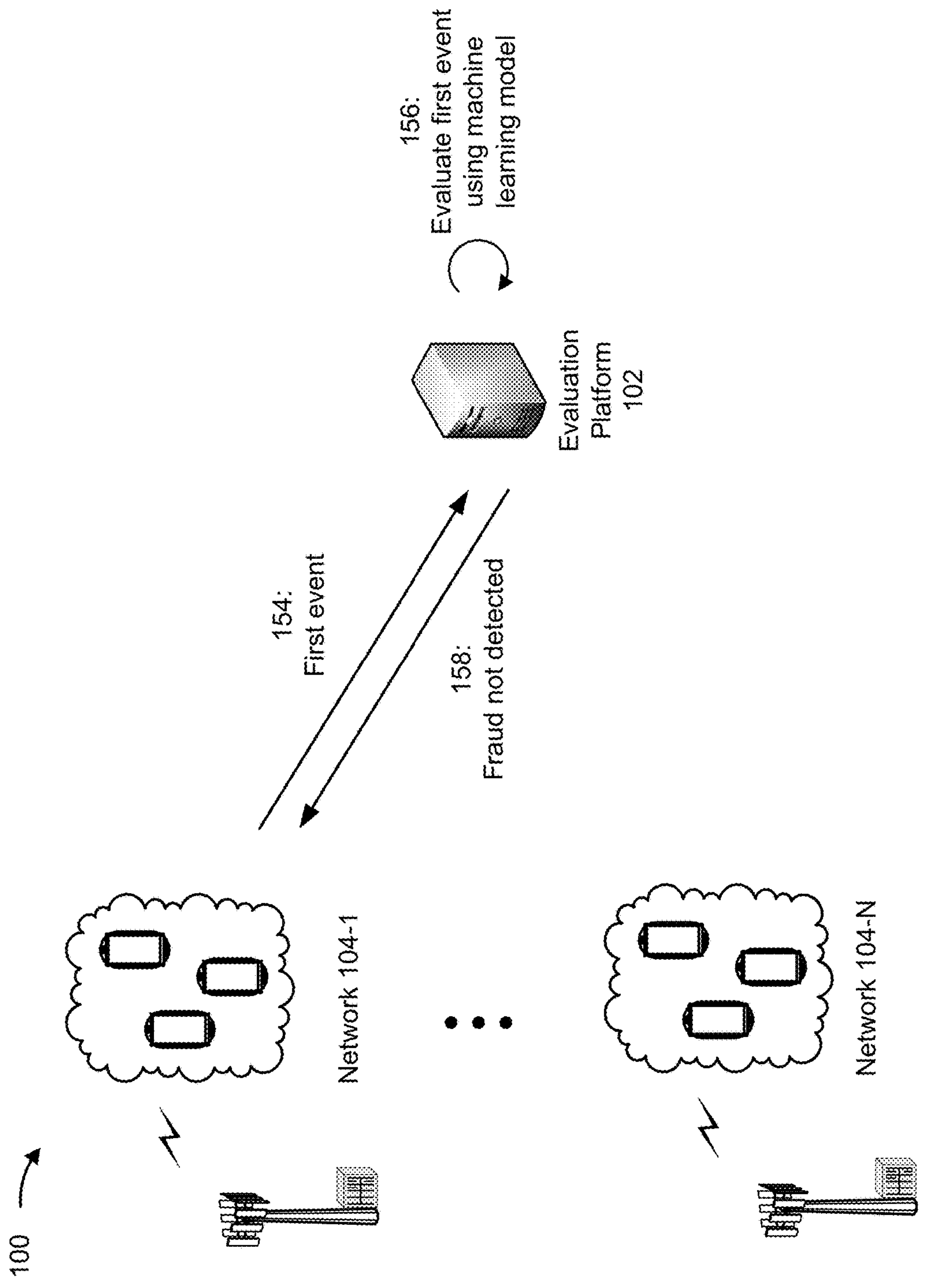

As shown in FIG. 1B, and by reference numbers 154 and 156, the evaluation platform 102 may receive information identifying a first event and may evaluate the first event using the machine learning model. For example, the evaluation platform 102 may receive data regarding access by a particular network device to a particular network service and may determine whether the data regarding the access is indicative of an instance of fraud or a security risk. In some implementations, the evaluation platform 102 may receive information identifying the first event based on monitoring a data stream. For example, the evaluation platform 102 may monitor one or more data sources associated with one or more network devices of the one or more networks 104. In this case, the evaluation platform 102 may perform predictions regarding whether an instance of fraud or a security risk is detected based on identifying a new value within a data stream. Additionally, or alternatively, the evaluation platform 102 may detect a triggering event, which may cause the evaluation platform 102 to evaluate data associated with the one or more networks 104. For example, the evaluation platform 102 may set a threshold level for a numeric parameter and may perform a fraud analysis using the machine learning model when the threshold level for the numeric parameter is exceeded. Additionally, or alternatively, the evaluation platform 102 may perform an evaluation on a periodic basis. For example, the evaluation platform 102 may be configured with a periodicity for analyzing data associated with the one or more networks. In other words, the evaluation platform 102 may be trained using data from a first time period and may evaluate data from a second time period to attempt to detect fraud or security risks during the second time period.

As further shown in FIG. 1B, and by reference number 158, the evaluation platform 102 may determine that fraud is not detected in connection with the first event. For example, the evaluation platform 102 may evaluate the data regarding the access to the particular network service and may determine that the data is predicted to be consistent with non-fraudulent use of the particular network service. In some implementations, the evaluation platform 102 may perform one or more automatic actions or generate one or more recommendations based on evaluating the data. For example, when the evaluation platform 102 determines that fraud is not detected in connection with the first event, the evaluation platform 102 may transmit an approval associated with the first event, such as an approval to gain access to or an approval to continue using the particular network service. In contrast, when the evaluation platform 102 determines that fraud is detected, the evaluation platform 102 may reject access to the particular network service, flag a network device as being involved in a fraudulent usage, or quarantine a software element associated with the network device (e.g., to stop a spread of, for example, malware).

Figure 1C:
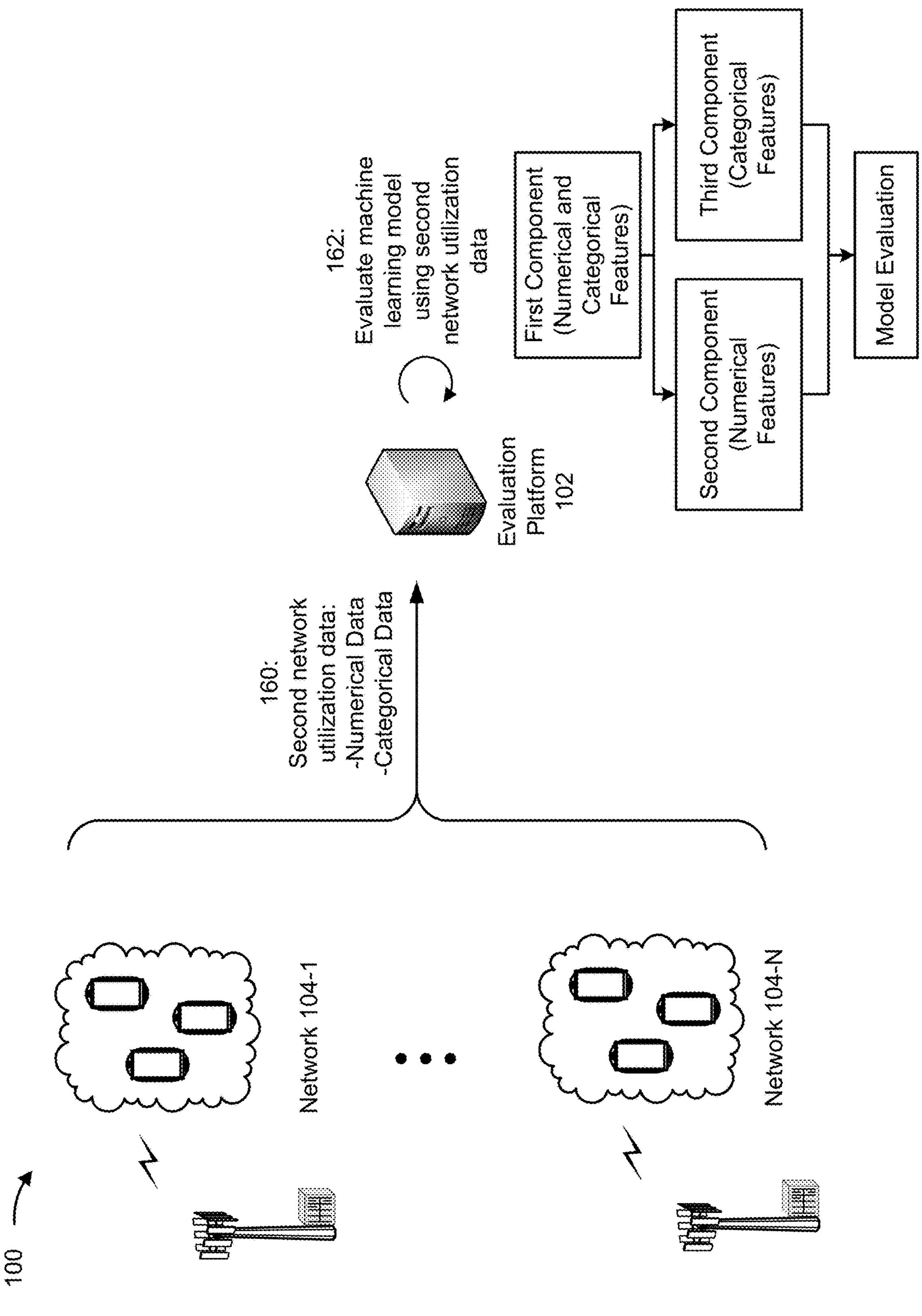

As shown in FIG. 1C, and by reference number 160, the evaluation platform 102 may receive second network utilization data. For example, the evaluation platform 102 may receive numerical data and/or categorical data regarding utilization of the one or more networks 104. In this case, the second network utilization data may be associated with a different time period than the first network utilization data. In other words, the first network utilization data may be associated with a first period of time and the second network utilization data may be associated with a second period of time occurring after the first period of time.

In some implementations, the evaluation platform 102 may receive the second network utilization data in connection with a configured periodicity. For example, the evaluation platform 102 may be configured to re-evaluate whether the machine learning model accurately represents an underlying structure of the network utilization data on a periodic basis. In this case, the evaluation platform 102 may communicate with one or more network devices of the one or more networks 104 to obtain data associated with a particular period. Additionally, or alternatively, the evaluation platform 102 may receive the second network utilization data in connection with an event. For example, when the evaluation platform 102 detects an event for which to perform a prediction, as described above, the evaluation platform 102 may use received data regarding a time period proximate to the event (e.g., data for a minute, hour, day, or month preceding the event, among other examples) to re-evaluate the machine learning model in connection with performing a prediction regarding the event. Additionally, or alternatively, the evaluation platform 102 may receive second network utilization data in connection with a data stream. For example, the evaluation platform 102 may receive network data that is generated regarding the one or more networks 104 and may continuously evaluate the received network data to determine whether the machine learning model still accurately represents an underlying structure of the network utilization data (or, alternatively, does not accurate represent the underlying structure and is stale). In this case, the evaluation platform 102 may evaluate a threshold quantity of parameters or instances of measuring a parameter to determine that the machine learning model is stale and is to be re-trained.

As further shown in FIG. 1C, and by reference number 162, the evaluation platform 102 may evaluate the machine learning model using the second network utilization data. For example, the evaluation platform 102 may determine whether an underlying structure of the second network utilization data is different from an underlying structure of the first network utilization data. In this case, when the underlying structure of the second network utilization data is different from the underlying structure of the first network utilization data, the evaluation platform 102 may determine that the machine learning model is to be automatically retrained with the second network utilization data to ensure that the machine learning model does not perform inaccurate predictions.

In some implementations, to evaluate the machine learning model, the evaluation platform 102 may use evaluation components of a multi-component analysis system. For example, the evaluation platform 102 may include a first component for evaluating both numerical and categorical features, a second component for evaluating numerical features, and/or a third component for evaluating categorical features. In this case, the evaluation platform 102 may use a combination of results from the first component, the second component, and the third component to determine whether the machine learning model is stale (and is to be re-trained) or is valid (and is to be used for further predictions). In some implementations, the multi-component analysis system may be applicable to features of the second network utilization data. For example, when training the machine learning model, a vast set of variables may be reduced into a set of features of the machine learning model. Features of the machine learning model may include individual parameters of network utilization data or meta-parameters (e.g., derived from a transformation or combination of, for example, multiple parameters of network utilization data).

In some implementations, the evaluation platform 102 may use multiple sub-components to evaluate features of the machine learning model, with respect to the second network utilization data, when using the multi-component analysis system. For example, as described in more detail below, each component may include multiple sub-components that may perform evaluations to determine whether the machine learning model, which is trained using the first network utilization data, is valid with respect to the second network utilization data.

As a specific example with regard to the first component, a time validator may determine whether data is being updated for each field of the network utilization data in accordance with a configured update periodicity. In this case, when a field has not been updated for a threshold period of time, the time validator may cause the evaluation platform 102 to output an error, indicating that the machine learning model is not valid for the second network utilization data. Accordingly, the evaluation platform 102 may update the machine learning model (e.g., by retraining the machine learning model such that the field that is not being updated is no longer a feature for the machine learning model) or may perform another action (e.g., correcting a software or hardware error that is causing the field to not be updated). Similarly, a field type validator may evaluate whether a numeric field of the second network utilization data includes a numeric value and/or whether a categorical field of the second network utilization data includes a categorical value.

As a specific example with regard to the second component, a range evaluator may evaluate whether a value, of the second network utilization data, in a numeric field is within an expected range determined based on the first network utilization data. In this case, when the range evaluator identifies outlier data for a threshold quantity of measurements, the range evaluator may cause the evaluation platform 102 to output an error, which may cause the evaluation platform 102 to re-train the machine learning model. Similarly, a numerical distribution evaluator may perform a statistical test, such as a two-sample t-test or a Mann-Whitney U test to determine whether two independent samples from the first and second network utilization data, respectively, are drawn from a population with the same distribution. As a specific example with regard to the third component, a frequency distribution evaluator may evaluate a frequency distribution of each value for a categorical feature, in a test period (e.g., the second network utilization data), relative to a base period (e.g., in the first network utilization data). In this case, when the frequency distributions of the test period and the base period differ by a threshold amount, the evaluation platform 102 may output an error.

In some implementations, the evaluation platform 102 may combine outputs from the multiple components to determine whether the machine learning model is stale and is to be re-trained. For example, the evaluation platform 102 may assign a score of '0' when a validation step (e.g., a single sub-component) evaluates positively for a feature and a score of '1' when a validation step evaluates negatively for the feature. In this case, when the score is less than a first threshold (e.g., less than 2), the evaluation platform 102 may conclude that the underlying structure of the network utilization data has not changed between the first network utilization data and the second network utilization data. As a result, the evaluation platform 102 may forgo re-training the machine learning model. When the score is in a first range (e.g., greater than or equal to 2 and less than 5 in one particular example of a range), the evaluation platform 102 may classify the feature at a first level (e.g., slight change to the underlying structure), when the score is in a second range (e.g., greater than or equal to 5 and less than 7 in one particular example of a range), the evaluation platform 102 may classify the feature at a second level (e.g., moderate change to the underlying structure), and when the score satisfies a second threshold (e.g., greater than or equal to 7 in one particular example of a range), the evaluation platform 102 may classify the feature at a third level (e.g., severe change to the underlying structure). The evaluation platform 102 may evaluate data for each feature of the machine learning model and may combine scores for each feature to evaluate the machine learning model as a whole. In other words, when a threshold percentage of features are classified as having moderate or severe changes to the underlying structure of the data, the evaluation platform 102 may determine that the machine learning model is stale and may re-train the machine learning model.

Figure 1D:
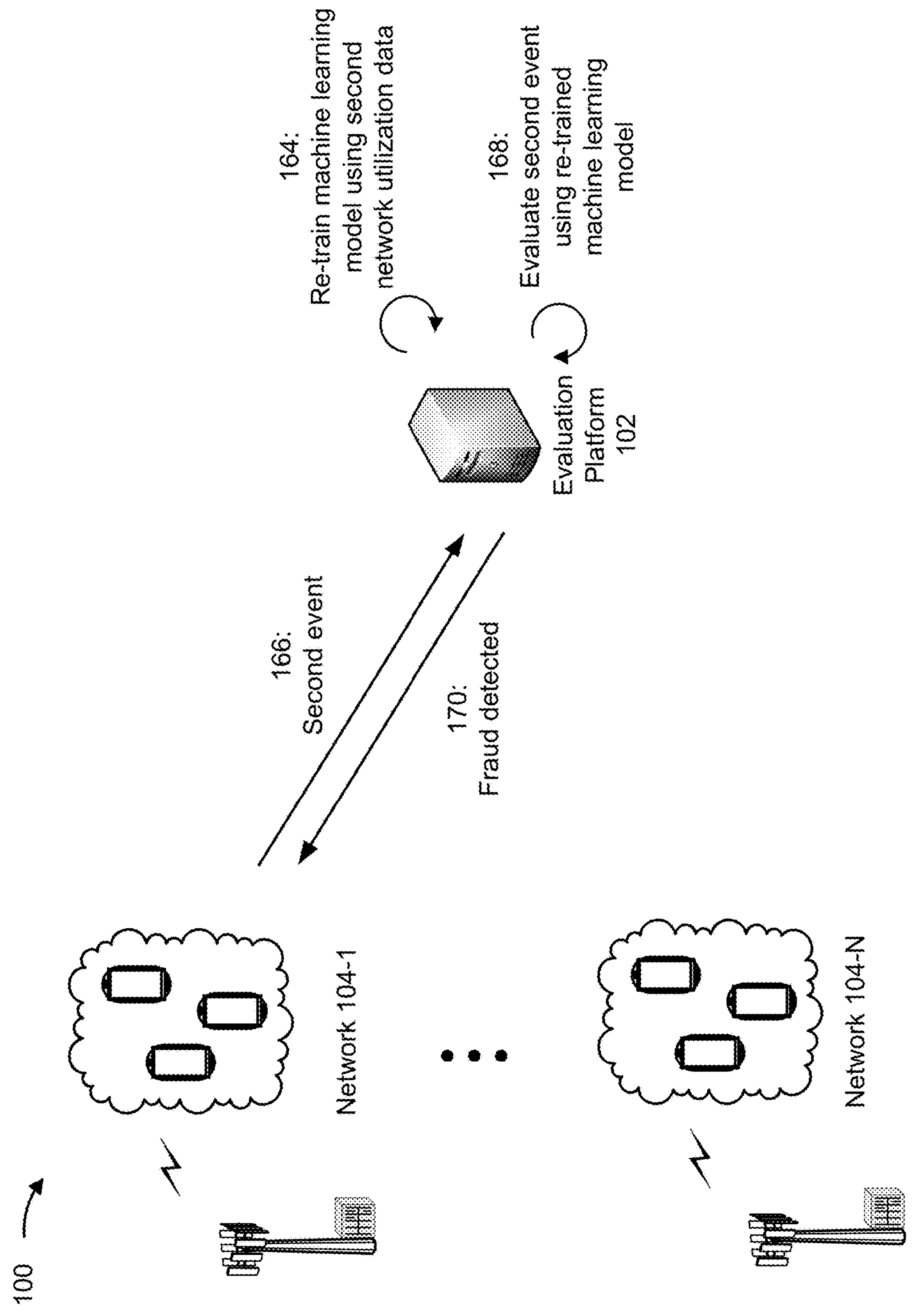

As shown in FIG. 1D, and by reference number 164, the evaluation platform 102 may re-train the machine learning model using the second network utilization data. For example, based on determining that the machine learning model has become stale, as described above, the evaluation platform 102 may automatically retrain the machine learning model. In this case, by automatically re-evaluating the machine learning model (e.g., on a continuous basis, an event-driven basis, or a periodic basis), the evaluation platform 102 avoids the machine learning model becoming stale and causing incorrect predictions. For example, the evaluation platform 102 may evaluate data and perform an incorrect, first prediction (e.g., of no fraud), re-train the machine learning model based on evaluating whether the machine learning model is stale, and may re-evaluate the data to perform a correct, second prediction (e.g., of fraud). In this case, the evaluation platform 102 enables more accurate prediction by ensuring that a machine learning model remains valid when predictions are being performed. Similarly, by only re-training the machine learning model when the machine learning model is evaluated as stale, the evaluation platform 102 avoids excess use of computing resources associated with excessive re-trainings of the machine learning model.

In some implementations, the evaluation platform 102 may retrain the machine learning model based on determining that there is a threshold amount of second network utilization data. For example, the evaluation platform 102 may determine that the second network utilization data includes more than a threshold quantity of measurements, events, logs, or other parameters, and may retrain the machine learning model. Alternatively, when the evaluation platform 102 determines that there is not a threshold amount of second network utilization data, the evaluation platform 102 may delay retraining the machine learning model to collect additional second network utilization data. In this case, the evaluation platform 102 may use the additional second network utilization data to retrain the machine learning model. Additionally, or alternatively, the evaluation platform 102 may trigger a retraining period in which the evaluation platform 102 collects third network utilization data based on determining that the machine learning model is stale (using the second network utilization data). In this case, the evaluation platform 102 collects the third network utilization data during a retraining period and uses the third network utilization data to retrain the machine learning model. Additionally, or alternatively, the evaluation platform 102 may combine some of the first network utilization data (e.g., most recent first network utilization data) with the second network utilization data to ensure a threshold total amount of network utilization data for retraining the machine learning model.

In some implementations, the evaluation platform 102 may modify the machine learning model, based on a result of evaluating the machine learning model, to retrain the machine learning model. For example, the evaluation platform 102 may remove a feature that has a large variation from the first network utilization data to the second network utilization data and may retrain the machine learning model without the removed feature. Additionally, or alternatively, the evaluation platform 102 may remove a feature associated with causing an error, as described in more detail below, when retraining the machine learning model. Additionally, or alternatively, the evaluation platform 102 may use other feature selection or rejection techniques to remove or preference certain features for retraining the machine learning model.

As further shown in FIG. 1D, and by reference numbers 166 and 168, the evaluation platform 102 may receive information associated with a second event and may evaluate the second event using the re-trained machine learning model. For example, the evaluation platform 102 may detect usage of a particular network service by a particular user device and may analyze data associated with the usage of the particular network service to determine whether the usage of the particular network service is indicative of fraud or a security risk.

As further shown in FIG. 1D, and by reference number 170, the evaluation platform 102 may detect fraud in connection with the usage of the particular network service. For example, based on evaluating the second event using the re-trained machine learning model, the evaluation platform 102 may determine that fraud is detected and may perform one or more automatic response actions, such as fraud management actions or risk evaluation actions, to mitigate or eliminate the fraud. In this case, the one or more automatic response actions may include denying access to the particular network service, flagging a particular network device as a security risk, changing one or more access parameters for the particular network service (e.g., to prevent future access to the particular network service), altering one or more network parameters (e.g., to prevent a security risk from affecting other network devices), or quarantining a particular network device or a particular software element, among other examples.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
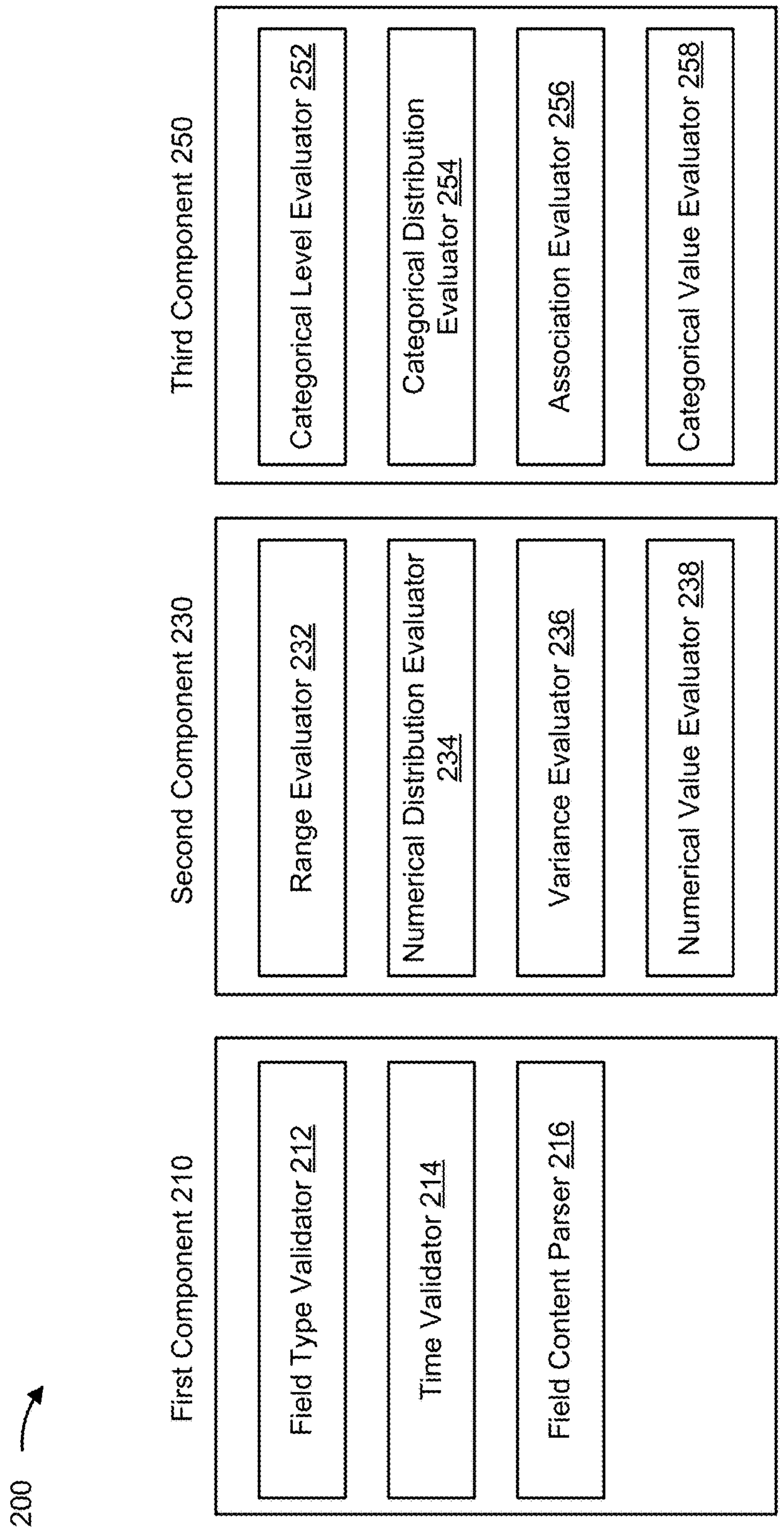
FIG. 2 is a diagram of an evaluation system associated with predictive machine learning model retraining.

FIG. 2 is a diagram of an evaluation system 200 associated with predictive machine learning model retraining. As shown in FIG. 2, the evaluation system 200 includes a first component 210, a second component 230, and a third component 250.

In some implementations, the first component 210 is configured for analyzing a set of features of a machine learning model. For example, the first component 210 includes a field type validator 212 to validate a field type of data for the machine learning model. For example, the field type validator 212 may detect that the field type of the data does not match a configured field type for the data. In this case, the field type of the data may be a numeric type and the configured field type for the data being an alphabetic type. Alternatively, the field type of the data may be an alphabetic type, and the configured field type for the data may be a numeric type. In this case, the evaluation system 200 may output an error indicator indicating that the field type for the data does not match the configured field type for the data.

In some implementations, the first component 210 includes a time validator 214 to validate whether the data for the machine learning model is being updated in accordance with a configured time interval. For example, the time validator 214 may determine that the data has not been updated within the configured time interval. In this case, the evaluation system 200 may output an error indicator indicating that the data has not been updated within the configured time interval. Additionally, or alternatively, the evaluation system 200 may automatically alter a software or hardware configuration to cause the field to start being updated according to the configured time interval, thereby automatically correcting the error without re-training the machine learning model.

In some implementations, the first component 210 includes a field content parser 216 to validate whether a field of the data is blank. For example, the field content parser 216 may determine that the field of the data does not include any value or includes a configured null value. In this case, the evaluation system 200 may output an error indicator indicating that the field of the data is blank.

In some implementations, the second component 230 is configured for analyzing a first subset of features of the set of features of the machine learning model. For example, the second component 230 is configured for analyzing one or more numerical features. In some implementations, the second component 230 includes a range evaluator 232 to determine whether a numerical value of a numerical variable, of the first subset of features, is within a configured numerical range. For example, the range evaluator 232 may determine, based at least in part on a historical data set, a configured numerical range (e.g., a lower bound and/or an upper bound or a threshold deviation from an average or median value) for a numerical value. In this case, when the numerical value is not within the configured numerical range across a threshold quantity of instances, the evaluation system 200 may output an error indicator indicating that the numerical value is not within the configured numerical range across the threshold quantity of instances.

In some implementations, the second component 230 includes a numerical distribution evaluator 234 to determine whether a first sample, of the data, and a second sample, of the data, are drawn from a population with a common distribution. For example, the numerical distribution evaluator 234 may perform a statistical significance test (e.g., a two-sample t-test or a Mann-Whitney U test) to determine whether the first sample and the second sample are drawn from a population with a common distribution. Additionally, or alternatively, the numerical distribution evaluator 234 may perform a statistical significance test (e.g., a Moods median test) to identify a difference in a distribution between the first sample and the second sample (e.g., a median shift over a period of time). In this case, based at least in part on the statistical significance test, the evaluation system 200 may output an error indicator indicating that the first sample and the second sample are drawn from the population with the common distribution.

In some implementations, the second component 230 includes numerical variance evaluator 236 to determine whether a first sample and a second sample have a common variance. For example, the numerical variance evaluator 236 may perform a statistical test (e.g., an F-test or Levene's test) to determine whether a first sample and a second sample share the same variance (or have a variance within a threshold similarity). Additionally, or alternatively, the numerical variance evaluator 236 may perform a correlation analysis (e.g., using a Pearson correlation coefficient or a statistical significance of correlation coefficient) to determine whether relationships that exist in the first sample hold in the second sample. In this case, the evaluation system 200 may output an error indicator indicating that the first sample and the second sample do not have a common variance or that relationships have changed.

In some implementations, the second component 230 includes a numerical value evaluator 238 to determine whether the numerical variable is associated with a constant numerical value across a set of instances. For example, the numerical value evaluator 238 may determine that a numerical variable does not change across a configured quantity of instances. In this case, the evaluation system 200 may output an error indicator indicating that the numerical variable is associated with the constant numerical value across the set of instances.

In some implementations, the third component 250 is configured for analyzing a second subset of features of the set of features of the machine learning model. For example, the third component 250 is configured for analyzing one or more categorical features. In some implementations, the third component 250 includes a categorical level evaluator 252 to determine whether a categorical value of a categorical variable, of the second subset of features, is within a configured categorical range. For example, the categorical level evaluator 252 may determine, based at least in part on a historical data set, the configured categorical range for the categorical value. In this case, when the categorical value is not within the configured categorical range across a threshold quantity of instances, the evaluation system 200 may update the configured categorical range based on determining that the categorical value is not within the configured categorical range. Additionally, or alternatively, when a new categorical value is included in a field in a second sample, which was not a categorical value in the first sample, the evaluation system 200 may output an error.

Additionally, or alternatively, the third component 250 includes a categorical distribution evaluator 254 to determine whether a frequency distribution of a categorical feature, of the second subset of features, is within a configured range. For example, the categorical distribution evaluator 254 may determine a frequency distribution for a categorical value. In this case, when the frequency distribution is not within the configured range, the evaluation system 200 may output an error indicator.

Additionally, or alternatively, the third component 250 includes an association evaluator 256 to determine whether two categorical variables of the second subset of features have a different association in different datasets. For example, the association evaluator 256 may perform a statistical test to determine whether a first categorical variable, of a pair of categorical variables, and a second categorical variable, of the pair of categorical variables, have the association in a training dataset (e.g., a first network utilization dataset) (e.g., using a chi-squared test of independence) but do not have the association in an observed dataset (e.g., a second network utilization dataset) or vice versa. In this case, when the association differs between datasets, the evaluation system 200 may output an error indicator indicating that the association between the first categorical variable and the second categorical variable has changed.

Additionally, or alternatively, the third component 250 includes a categorical value evaluator 258 to determine whether the categorical variable is associated with a constant categorical value across a set of instances. For example, the categorical value evaluator 258 may determine that the categorical variable does not change over a threshold period of time. In this case, the evaluation system 200 may output an error indicator indicating that the categorical variable is associated with the constant numerical value across the set of instances.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
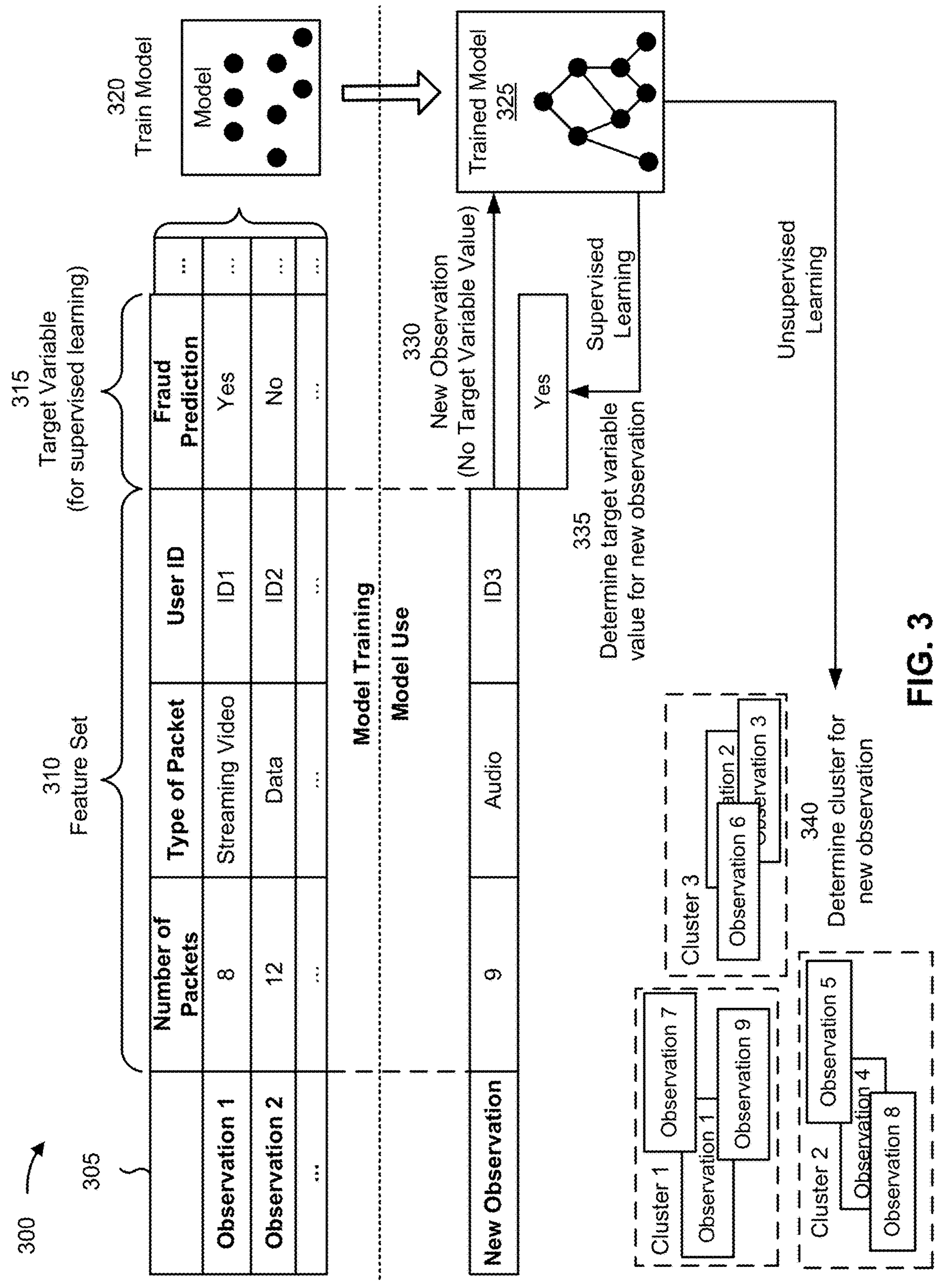
FIG. 3 is a diagram illustrating an example of training and using a machine learning model in connection with systems and methods for predictive machine learning model retraining.

FIG. 3 is a diagram illustrating an example 300 of training and using a machine learning model in connection with systems and methods for predictive machine learning model retraining. The machine learning model training and usage described herein may be performed using a machine learning system. The machine learning system may include or may be included in a computing device, a server, a cloud computing environment, or the like, such as the evaluation platform 401 described in more detail elsewhere herein.

As shown by reference number 305, a machine learning model may be trained using a set of observations. The set of observations may be obtained from training data (e.g., historical data), such as data gathered during one or more processes described herein. In some implementations, the machine learning system may receive the set of observations (e.g., as input) from the networks 440, as described elsewhere herein.

As shown by reference number 310, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the networks 440. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a quantity of packets, a second feature of a type of packet, a third feature of a user identifier (ID), and so on. As shown, for a first observation, the first feature may have a value of 8, the second feature may have a value of streaming video, the third feature may have a value of ID1, and so on. These features and feature values are provided as examples, and may differ in other examples. For example, the feature set, for a telecommunications prediction, may include one or more of the following features: a location, a set of signals, a log item, a call duration, an access log, a volume of data, a service request record, a billing record, or another type of feature based on a record mined from a telecommunications system. In another machine learning context another set of features is contemplated that are appropriate to the type of data for which a prediction is being performed.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable is a fraud prediction, which has a value of yes for the first observation.

The feature set and target variable described above are provided as examples, and other examples may differ from what is described above. For example, for a target variable of a risk evaluation (e.g., of an error in a network or a resource shortage in a network), the feature set may include time series data, network usage metrics, user device counts, or other network metrics.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, the machine learning system may train a decision tree algorithm for a machine learning model that is for prediction of whether access to a network or service thereof by a user device is fraudulent. After training, the machine learning system may store the machine learning model as a trained machine learning model 325 to be used to analyze new observations.

As an example, the machine learning system may obtain training data for the set of observations based on monitoring a network or a set of network devices thereof. In this case, the network or the set of network devices may store logs identifying network metrics, signal or messaging exchanges, requests for access to network services, or other information. The machine learning system may obtain the logs and parse the logs to extract the information included therein. Additionally, or alternatively, a monitoring device may monitor the network and periodically, or based on an occurrence of an event, feed network data to the machine learning system for performing predictions regarding a state of the network or a risk of fraudulent activity therein.

As shown by reference number 330, the machine learning system may apply the trained machine learning model 325 to a new observation, such as by receiving a new observation and inputting the new observation to the trained machine learning model 325. As shown, the new observation may include a first feature of a quantity of packets, a second feature of a type of packet, a third feature of a user identifier, and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 325 may predict a value of yes for the target variable of whether fraud (e.g., fraudulent access to a service) is predicted for the new observation, as shown by reference number 335. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, further investigating whether a user device is fraudulently accessing a service. The first automated action may include, for example, reconfiguring a network device to stop providing a service to a user device with a particular user identifier.

In some implementations, the trained machine learning model 325 may classify (e.g., cluster) the new observation in a cluster, as shown by reference number 340. The observations within a cluster may have a threshold degree of similarity. As an example, if the machine learning system classifies the new observation in a first cluster (e.g., a fraudulent access cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 325 may be re-trained using feedback information. For example, feedback may be provided to the machine learning model. The feedback may be associated with actions performed based on the recommendations provided by the trained machine learning model 325 and/or automated actions performed, or caused, by the trained machine learning model 325. In other words, the recommendations and/or actions output by the trained machine learning model 325 may be used as inputs to re-train the machine learning model (e.g., a feedback loop may be used to train and/or update the machine learning model). For example, the feedback information may include additional data from the network, as described above.

In this way, the machine learning system may apply a rigorous and automated process to performing a prediction. The machine learning system may enable recognition and/or identification of tens, hundreds, thousands, or millions of features and/or feature values for tens, hundreds, thousands, or millions of observations, thereby increasing accuracy and consistency and reducing delay associated with performing a prediction relative to requiring computing resources to be allocated for tens, hundreds, or thousands of operators to manually performing a prediction using the features or feature values.

As indicated above, FIG. 3 is provided as an example. Other examples may differ from what is described in connection with FIG. 3.

Figure 4:
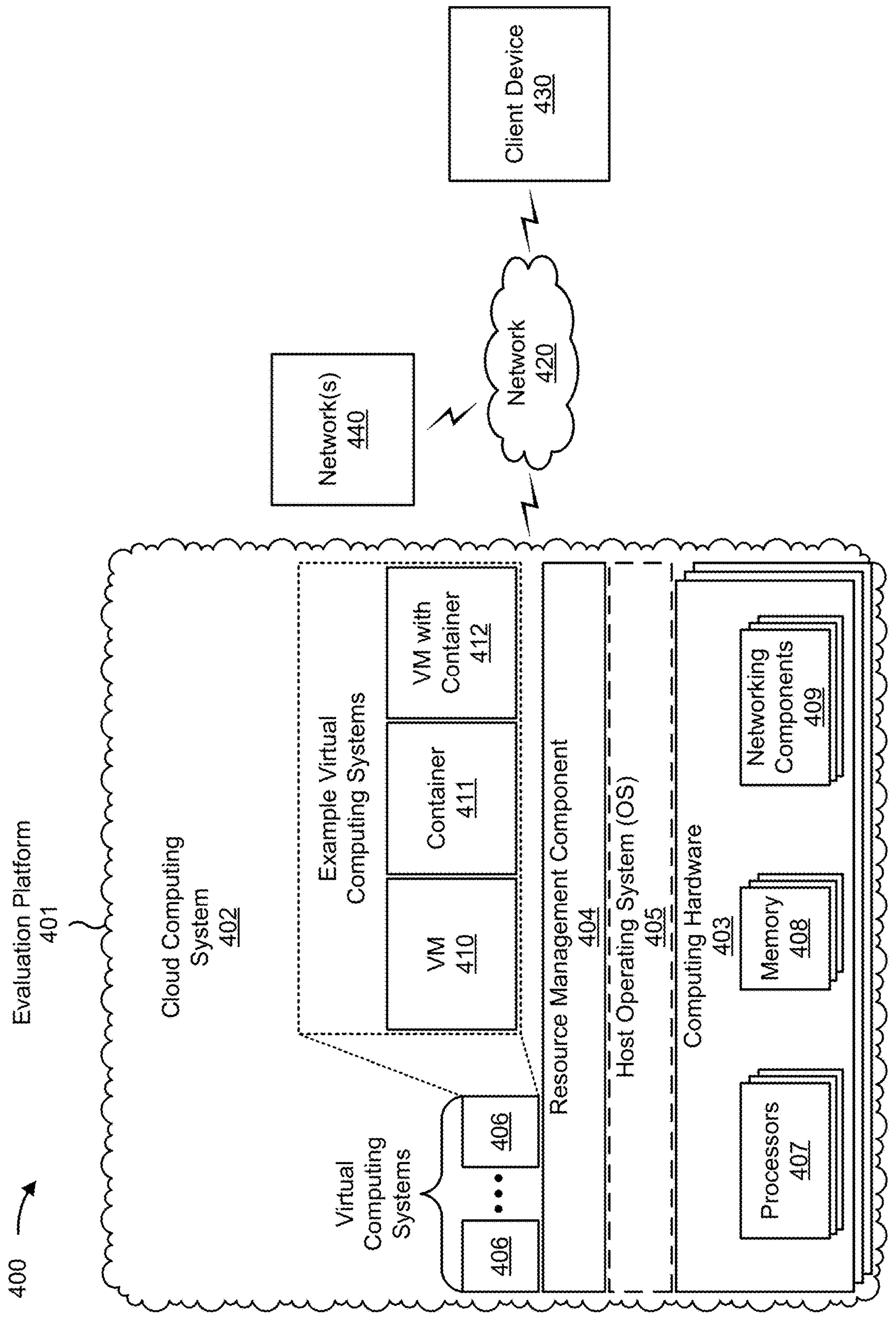
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include an evaluation platform 401, which may include one or more elements of and/or may execute within a cloud computing system 402. The cloud computing system 402 may include one or more elements 403-412, as described in more detail below. As further shown in FIG. 4, environment 400 may include a network 420, a client device 430, and/or a set of networks 440. Devices and/or elements of environment 400 may interconnect via wired connections and/or wireless connections.

The cloud computing system 402 may include computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the evaluation platform 401 may include one or more elements 403-412 of the cloud computing system 402, may execute within the cloud computing system 402, and/or may be hosted within the cloud computing system 402, in some implementations, the evaluation platform 401 may not be cloud-based (e.g., may be implemented outside of a cloud computing system) or may be partially cloud-based. For example, the evaluation platform 401 may include one or more devices that are not part of the cloud computing system 402, such as device 500 of FIG. 5, which may include a standalone server or another type of computing device. The evaluation platform 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The client device 430 may include one or more devices capable of receiving, generating, storing, processing, and/or providing information associated with predictive machine learning model retraining, as described elsewhere herein. The client device 430 may include a communication device and/or a computing device. For example, the client device 430 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The set of networks 440 may include one or more wired and/or wireless networks for which data is being generated for machine learning model based analysis. For example, a network 440 may include a cellular network, a PLMN, a LAN, a WAN, a private network, the Internet, and/or a combination of these or other types of networks. Although some aspects are described in terms of data being generated by a telecommunications network, other types of networks or data sources, which can generate data for analysis via machine learning models, are contemplated.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
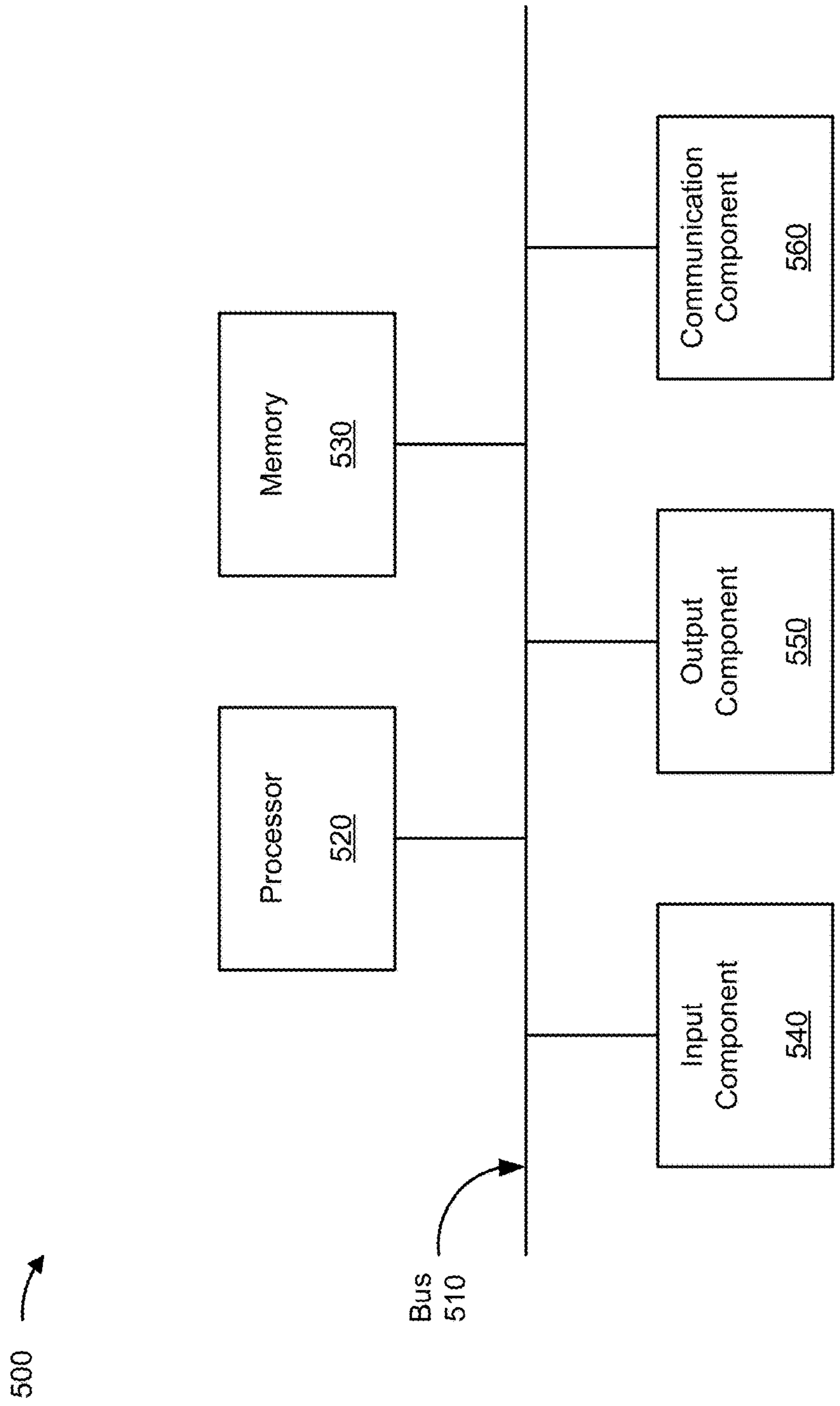
FIG. 5 is a diagram of example components of a device associated with predictive machine learning model retraining.

FIG. 5 is a diagram of example components of a device 500 associated with predictive machine learning model retraining. The device 500 may correspond to the evaluation platform 401, the cloud computing system 402, and/or the client device 430. In some implementations, the evaluation platform 401, the cloud computing system 402, and/or the client device 430 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
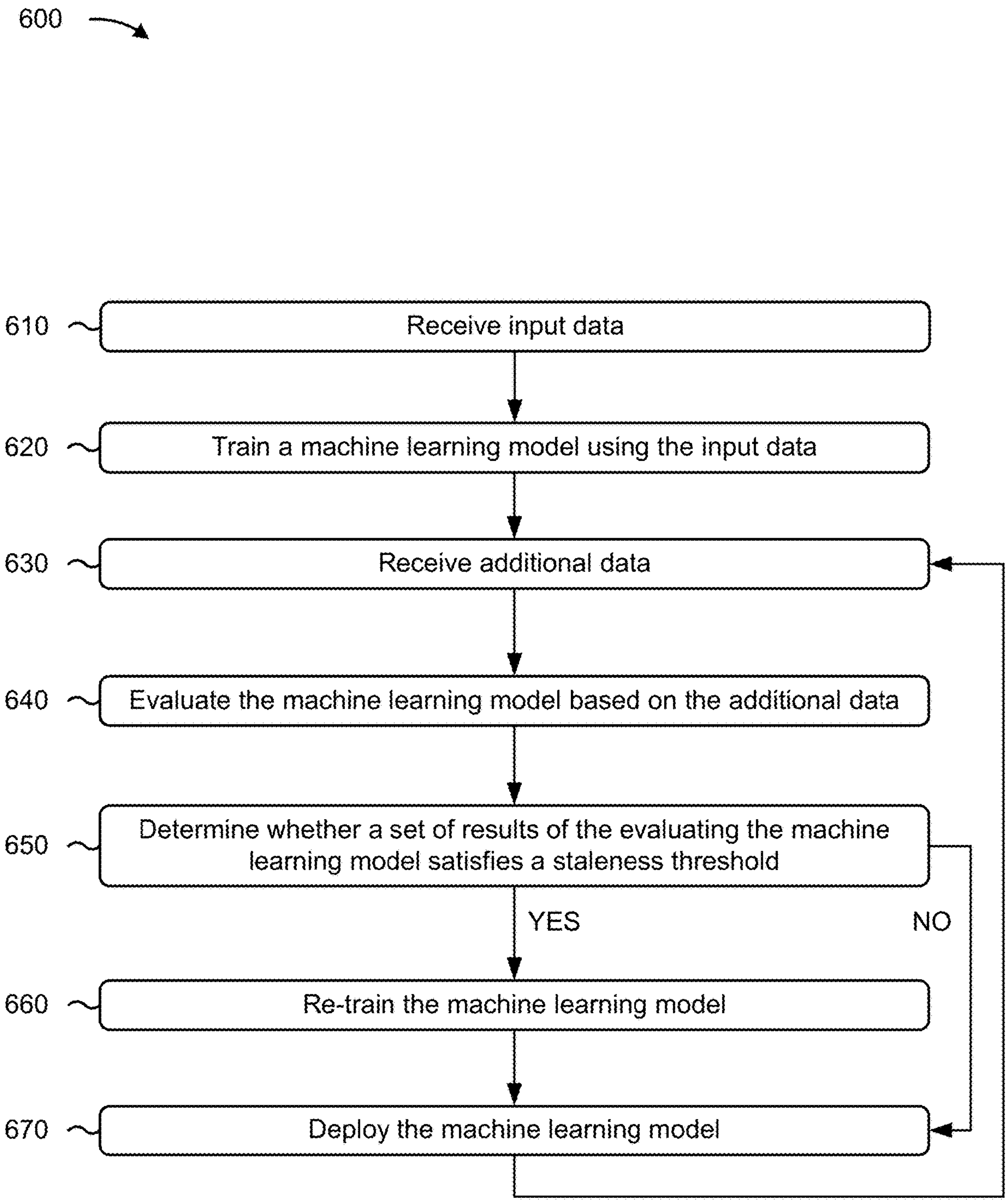
FIG. 6 is a flowchart of an example process associated with predictive machine learning model training.

FIG. 6 is a flowchart of an example process 600 associated with predictive machine learning model training. In some implementations, one or more process blocks of FIG. 6 may be performed by an evaluation platform (e.g., evaluation platform 401). In some implementations, one or more process blocks of FIG. 6 may be performed by another device or a group of devices separate from or including the evaluation platform, such as a client device (e.g., client device 430). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving input data (block 610). For example, the evaluation platform may receive input data, the input data including numerical data and categorical data, as described above. Input data, which may also be referred to as raw data, may different data sets that are generated by different components of a machine learning model. For example, the evaluation platform may receive numerical or categorical data, some of which may be associated with an event or a time series. In some implementations, the data may be associated with one or more aspects of a telecommunications network. For example, the data may include data relating to access to services and/or payment for the access to services, to enable a machine learning model to determine whether there is fraud being detected or another type of security risk.

As further shown in FIG. 6, process 600 may include training a machine learning model using the input data (block 620). For example, the evaluation platform may train a machine learning model using the input data, the machine learning model including one or more numerical features based on the numerical data and one or more categorical features based on the categorical data, as described above. For example, the evaluation platform may train an initial version of the machine learning model based on the input data, which the evaluation platform may split into training data and validation data for machine learning model training, as described above. Generally, the input data may have an underlying structure and training the machine learning model may enable values, weights, connections, clusters, or rules to be generated that represent the underlying structure of the input data. However, as described above, the underlying structure of the input data is subject to change over time. Accordingly, as described herein, the evaluation platform may periodically reevaluate the initial machine learning model in light of new data, to determine whether the underlying structure of the new data remains accurately represented by the initial machine learning model (or, alternatively, whether to retrain the initial machine learning model to better capture a new underlying structure of the new data).

As further shown in FIG. 6, process 600 may include receiving additional data (block 630). For example, the evaluation platform may receive additional data, the additional data including numerical data and categorical data, as described above. For example, after receiving first data that is associated with a first period of time and training a machine learning model, the evaluation platform may receive second data associated with a second period of time. In this case, if an underlying structure or characteristic of data has changed from the first period of time to the second period of time, the evaluation platform may determine that it is appropriate to retrain the machine learning model, as described above.

As further shown in FIG. 6, process 600 may include evaluating the machine learning model based on the additional data (block 640). For example, the evaluation platform may evaluate, using a set of components, the machine learning model based on receiving the additional data, as described above. In some implementations, the machine learning model may be evaluated using a first component, of the set of components, applied to the numerical data and the categorical data, a second component, of the set of components, applied to the numerical data, and a third component, of the set of components, applied to the categorical data. In some the evaluation platform may evaluate one or more modules of each component, of the set of components, of the machine learning model, and generate, based on evaluating the one or more modules, one or more scores. The evaluation platform may use the one or more scores to determine whether a threshold is satisfied. In some implementations, process 600 includes combining the one or more scores to generate a combined score, and wherein determining whether the one or more scores satisfy the threshold comprises determining whether the combined score satisfies the threshold. In some implementations, the evaluation platform may combine the one or more scores by applying a first weight to a first score of the one or more scores to obtain a first weighted score, applying a second weight to a second score of the one or more scores to obtain a second weighted score, and combining the first weighted score and the second weighted score.

As further shown in FIG. 6, process 600 may include determining whether a set of results of the evaluating the machine learning model satisfies a staleness threshold (block 650). For example, the evaluation platform may determine whether a set of results of the evaluating the machine learning model using the set of components satisfies a staleness threshold, as described above.

As further shown in FIG. 6, process 600 may include retraining the machine learning model (block 660). For example, the evaluation platform may retrain the machine learning model, to generate a re-trained machine learning model, using the additional data based on the set of results satisfying the staleness threshold (block 650—YES), as described above.

As further shown in FIG. 6, process 600 may include deploying the machine learning model (block 670). For example, the evaluation platform may deploy the machine learning model, as described above. In this case, the evaluation platform may deploy the re-trained machine learning model based on re-training the machine learning model (block 660) or may deploy the original machine learning model based on the set of results of evaluating the machine learning model not satisfying the staleness threshold for re-training (block 650—NO). In some implementations, based on deploying the machine learning model, the evaluation platform may continue receiving additional data (block 630) for further evaluation of the machine learning model (block 640). For example, the evaluation platform may detect an event; extracting data from the event; evaluate the data using the machine learning model; determine, based on evaluating the data using the machine learning model; that an outcome is detected; and perform an action based on determining that the outcome is detected.

Additionally, or alternatively, the evaluation platform may re-evaluate the data using a re-trained machine learning model; determine, based on re-evaluating the data using the re-trained machine learning model, that a second outcome is detected (e.g., the second outcome being different than the first outcome); and perform a second action based on determining that the second outcome is detected (e.g., the second action being different than the first action). In other words, the evaluation platform may perform a prediction using the machine learning model and perform a first action based on the prediction, but may re-train the machine learning model, as described above, which may result in performing a different prediction and performing a second action.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A device, comprising:

one or more processors configured to:

train a machine learning model using first data associated with network utilization by a set of user devices, the first data including first numerical data and first categorical data, the machine learning model including one or more numerical features based on the first numerical data and one or more categorical features based on the first categorical data;

receive second data associated with network utilization by the set of user devices, the second data including second numerical data and second categorical data;

evaluate, using a set of evaluation components, the machine learning model based on receiving the second data;

the machine learning model being evaluated using a first component, of the set of evaluation components, applied to the second numerical data and the second categorical data, a second component, of the set of evaluation components, applied to the second numerical data, and a third component, of the set of evaluation components, applied to the second categorical data;

determine that a set of results of evaluating the machine learning model using the set of evaluation components satisfies a threshold;

re-train the machine learning model, to generate a re-trained machine learning model, using second input data based on the set of results satisfying the threshold;

detect an event associated with a user device, of the set of user devices, utilizing a network;

evaluate one or more variables associated with the event using the re-trained machine learning model; and perform a response action based on evaluating the one or more variables.

2. The device of claim 1, wherein the response action is a fraud management action or a risk evaluation action.

3. The device of claim 1, wherein the one or more processors are further configured to:

extract third data from the event; and determine the one or more variables based on extracting the third data from the event.

4. The device of claim 3, wherein the first data is associated with a first period of time and the second data is associated with a second period of time, the second period of time occurring after the first period of time.

5. The device of claim 3, wherein the one or more processors, to evaluate the machine learning model, are configured to:

evaluate one or more modules of each component, of the set of evaluation components, of the machine learning model; and generate, based on evaluating the one or more modules, one or more respective scores; and wherein the one or more processors, to determine whether the set of results of evaluating the machine learning model, using the set of evaluation components, satisfies the threshold, are configured to:

determine whether the one or more respective scores satisfy the threshold.

6. The device of claim 5, wherein the one or more processors are further configured to:

combine the one or more scores to generate a combined score; and wherein the one or more processors, to determine whether the one or more scores satisfy the threshold, are configured to:

determine whether the combined score satisfies the threshold.

7. The device of claim 6, wherein the one or more processors, to combine the one or more scores, are configured to:

apply a first weight to a first score of the one or more scores to obtain a first weighted score;

apply a second weight to a second score of the one or more scores to obtain a second weighted score; and combine the first weighted score and the second weighted score based on applying the first weight to the first score and the second weight to the second score.

8. A method, comprising:

receiving, by a device, first input data, the first input data including first numerical data and first categorical data;

training, by the device, a machine learning model using the first input data, the machine learning model including one or more numerical features based on the first numerical data and one or more categorical features based on the first categorical data;

receiving, by the device, second input data, the second input data including second numerical data and second categorical data;

evaluating, by the device and using a set of evaluation components, the machine learning model based on receiving second input data;

the machine learning model being evaluated using a first component, of the set of evaluation components, applied to the second numerical data and the second categorical data, a second component, of the set of evaluation components, applied to the second numerical data, and a third component, of the set of evaluation components, applied to the second categorical data;

determining, by the device, whether a set of results of the evaluating the machine learning model using the set of evaluation components satisfies a threshold;

retraining, by the device, the machine learning model, to generate a re-trained machine learning model, using the second input data based on the set of results satisfying the threshold; and deploying, by the device, the re-trained machine learning model.

9. The method of claim 8, further comprising:

detecting an event;

extracting third data from the event;

evaluating the third data using the machine learning model;

determining, based on evaluating the third data using the machine learning model, that a first outcome is detected; and performing a first action based on determining that the first outcome is detected.

10. The method of claim 9, further comprising:

re-evaluating the third data using the re-trained machine learning model;

determining, based on re-evaluating the third data using the re-trained machine learning model, that a second outcome is detected, the second outcome being different than the first outcome; and performing a second action based on determining that the second outcome is detected, the second action being different than the first action.

11. The method of claim 8, wherein the first input data is associated with a first period of time and the second input data is associated with a second period of time, the second period of time occurring after the first period of time.

12. The method of claim 8, wherein evaluating the machine learning model comprises:

evaluating one or more modules of each component, of the set of evaluation components, of the machine learning model; and generating, based on evaluating the one or more modules, one or more scores; and wherein determining whether the set of results of the evaluating the machine learning model using the set of evaluation components satisfies the threshold comprises:

determining whether the one or more scores satisfy the threshold.

13. The method of claim 12, further comprising:

combining the one or more scores to generate a combined score; and wherein determining whether the one or more scores satisfy the threshold comprises:

determining whether the combined score satisfies the threshold.

14. The method of claim 13, wherein combining the one or more scores comprises:

applying a first weight to a first score of the one or more scores to obtain a first weighted score;

applying a second weight to a second score of the one or more scores to obtain a second weighted score; and combining the first weighted score and the second weighted score based on applying the first weight to the first score and the second weight to the second score.

15. A system, comprising:

a first component for analyzing a set of features of a machine learning model, the first component including:

a field type validator to validate a field type of input data for the machine learning model, a time validator to validate whether the input data for the machine learning model is being updated in accordance with a configured time interval, and a field content parser to validate whether a field of the input data is blank;

a second component for analyzing a first subset of features, of the set of features of the machine learning model, the first subset including one or more numerical features, the second component including:

a range evaluator to determine whether a numerical value of a numerical variable, of the first subset of features, is within a configured numerical range, a numerical distribution evaluator to determine whether a first sample, of the input data, and a second sample, of the input data, are drawn from a population with a common distribution, a variance evaluator to determine whether the first sample and the second sample have a common variance, a numerical value evaluator to determine whether the numerical variable is associated with a constant numerical value across a set of instances; and a third component for analyzing a second subset of features, of the set of features of the machine learning model, the second subset including one or more categorical features, the third component including:

a categorical level evaluator to determine whether a categorical value of a categorical variable, of the second subset of features, is within a configured categorical range, a categorical distribution evaluator to determine whether a frequency distribution of a categorical feature, of the second subset of features, is within a configured range, an association evaluator to determine whether two categorical variables of the second subset of features have a different association in different datasets, and a categorical value evaluator to determine whether the categorical variable is associated with a constant categorical value across a set of instances.

16. The system of claim 15, wherein the field type validator is configured to:

detect that the field type of the input data does not match a configured field type for the input data, the field type of the input data being a numeric type and the configured field type for the input data being an alphabetic type, or the field type of the input data being the alphabetic type and the configured field type for the input data being the numeric type; and output an error indicator indicating that the field type for the input data does not match the configured field type for the input data.

17. The system of claim 15, wherein the time validator is configured to:

determine that the input data has not been updated within the configured time interval; and output an error indicator indicating that the input data has not been updated within the configured time interval.

18. The system of claim 15, wherein the field content parser is configured to:

determine that the field of the input data is blank; and output an error indicator indicating that the field of the input data is blank.

19. The system of claim 15, wherein the range evaluator is configured to:

determine, based at least in part on a historical data set, the configured numerical range for the numerical value;

determine that the numerical value is not within the configured numerical range across a threshold quantity of instances; and output an error indicator indicating that the numerical value is not within the configured numerical range across the threshold quantity of instances.

20. The system of claim 15, wherein the numerical distribution evaluator is configured to:

perform a statistical significance test to determine whether the first sample and the second sample are drawn from the population with the common distribution; and output an error indicator indicating that the first sample and the second sample are not drawn from the population with the common distribution.

* * * * *